United States Patent [19]

Proynoff

[11] 4,227,894
[45] Oct. 14, 1980

[54] ION GENERATOR OR ELECTROSTATIC ENVIRONMENTAL CONDITIONER

[76] Inventor: John D. Proynoff, 3315 N. 25th Pl., Phoenix, Ariz. 85016

[21] Appl. No.: 949,411

[22] Filed: Oct. 10, 1978

[51] Int. Cl.² .............................................. B03C 3/01
[52] U.S. Cl. ........................................ 55/126; 55/152; 55/136; 361/231
[58] Field of Search .............. 361/225, 226, 231, 232, 361/233, 235; 55/2, 131, 126, 136–138, 151–154, 279; 422/22; 250/285, 286, 423 R, 427, 489

[56] References Cited

U.S. PATENT DOCUMENTS

| | | | |
|---|---|---|---|
| 1,980,521 | 11/1934 | Hahn | 55/2 |
| 2,765,975 | 10/1956 | Lindenblad | 361/230 |
| 3,054,553 | 9/1962 | White | 55/139 |
| 3,551,743 | 12/1970 | Koepke et al. | 361/230 |
| 3,981,695 | 9/1976 | Fuchs | 55/139 |
| 4,133,652 | 1/1979 | Ishikawa et al. | 55/126 |

FOREIGN PATENT DOCUMENTS 1078096  3/1960  Fed. Rep. of Germany ............. 35/154
2622749 12/1977  Fed. Rep. of Germany .......... 361/231

*Primary Examiner*—Bernard Nozick
*Attorney, Agent, or Firm*—Warren F. B. Lindsley

[57] ABSTRACT

An improved ion generator comprising a set of specially shaped negative electrodes, a positive accelerator in the form of a ring or flat plates, and a grounded screen. The parts are serially arranged in a tube or channel and connected to the output terminals of a high-voltage direct-current power source. Negative ions are produced for the permeation of the atmosphere in living quarters.

5 Claims, 10 Drawing Figures

ION GENERATOR OR ELECTROSTATIC ENVIRONMENTAL CONDITIONER

BACKGROUND OF THE INVENTION

In recent years there has been an ever increasing awareness and, along with it, a growing concern about certain environmental conditions affecting man's health and his feeling of well being. This includes the threat of man made pollution as well as the effects of such natural phenomena as sun spot activity and certain well known winds on man.

The so called Great Winds of the Earth include, among others, the Alphine Foehn, The Sirocco, the Simoon, the Khamsin and the Marmatan of Africa, the Mistral of Provence, the Boras of the Adriatic, the karaburan of the Gobi and the Chinook and Santa Ana of North America. These winds are dreaded by the local inhabitants not so much for their physical destructive forces as for their demoralizing effect on the psychological and physiological states of man. Accounts and statistical data concerning the frequency of these winds' related atmospheric disturbances and their relationship to hospital admissions, suicides, crime rates, etc., are overwhelmingly in support of this link between man and environment.

Predominance of positive air ions is believed to be detrimental to health while clinical evidence indicates that negative ions are beneficial. The evidence in support of this belief is overwhelming. Recent medical research has shown that an overproduction of the biochemical Serotonin in the blood causes biophysiological as well as psychological disorders in animals and men alike. Similar effects have been observed from exposure to a heavy concentration of positive ions. In both cases relief has been achieved by the inhalation of negative ions.

The Great Winds of the Earth all have one thing in common. They all denude the air of moisture and most importantly, cause air ion imbalance. This, in turn, is believed to be the principal causes of the winds' detrimental effects on man.

Much has been written since the turn of the century about the biological and psychological effects produced by positive and negative ion concentrations in the atmosphere.

As reported by the Journal of the Franklin Institute in 1936 (Article by Lewis R. Koller, Ph.D. entitled "Ionization of the Atmosphere and its Biological Effects"), experiments conducted by Caspari in 1902 indicated mountain sickness could be ascribed to high values of ion content. The same article reports that Sokoloff in 1903 correlated his rheumatism with exceptionally high values of the ion content in the air which he observed in the caucasus. These observations and experiments were followed by the work of Dessauer who conducted extensive studies of the effects of ion concentrations on bodily functions such as blood pressure and respiration.

Dessauer found that positive ions increased blood pressure and the rate of respiration while negative ions produced the opposite effects. Positive ions produced feelings of fatigue, dizziness, headaches, roaring in the ears, nausea and the like while negative ions produced exhilaration and a general feeling of well being. Most striking, however, was the discovery of the apparent therapeutic effects of ionized air upon persons suffering from a group of diseases including high blood pressure, rheumatisim, gout, neuritis and neuralgia, acute and chronic bronchitis, cardial and bronchial asthma and heart and arterial diseases.

The October 1952 issue of the same journal carried an article by Thomas L. Martin, Jr. (Climate Control through Ionization) which reported ties betweein ionization levels and psychiatric disorders. This article also reported that negatively ionized air had been found to greatly inhibit the growth of transplanted tumors in rats and mice.

These studies continue to the present day as indicated by still more recent articles on the subject including an IEEE paper, "New Advances in Parapsychology," by James B. Beal for the 1974 IEEE International Convention and Exposition of March 26-29, 1974. Beal delves still further into the effects of electrical phenomena including ionic conditions on the functioning of the human body.

By the 1960's, there was enough general acceptance of the importance of these effects to have encouraged commercial ventures involving the development and production of ion generating equipment. An article in the Jan. 23, 1960 issue of Business Week reported that equipment for negative ion generation was being offered by Emerson Electric and Michael Electric of New Haven, Connecticut. Philco started selling its Ionitron as an added feature of its air conditioning equipment to aid victims of hay fever and other allergies. Emerson had introduced an ionization unit employing radioactive tritum. Michael Electric incorporated an ionization unit in its air purifier. Westinghouse, G.E. and Carrier were well along in the development of ionization equipment. Some of these manufacturers employed ultraviolet lamps which released electrons from aluminum foil.

While such interest continues to the present time, the widespread use of such devices hs not yet been realized, perhaps because the generating equipment heretofore available has been either too expensive or too prone to constitute a safety hazard in some aspect of its use. The beneficial results claimed in the references are undoubtedly a result of the improved environment through negative ionization. The purpose of this invention is directed to improving indoor environmental living conditions and not its therapeutic effect, if any.

A number of methods have been proposed in the literature for the production of ions. Dessauer gave the following list:

X-rays;
Ultra-violet;
High voltage brush discharge between needle points;
High frequency;
Flames;
Incandescent alkalais and metals.

SUMMARY OF THE INVENTION

In accordance with the invention claimed an improved ion generator is provided for use as a source of negative ions in the home, the ions being produced at specially shaped negative electrodes and propelled into the atmosphere with the help of a positive ring or plates.

It is, therefore, one object of the present invention to provide an improved negative ion generator suitable for commercial production and home use.

Another object of this invention is to provide such an ion generator in a form which produces no significant amounts of deleterious or toxic by-products such as ozone or the oxides of nitrogen, cyanogen or ammonia.

A further object of this invention is to provide such a generator which produces no significant level of ultraviolet light which can be harmful to the eyes.

A still further object of this invention is to provide such an ion generator which conveniently utilizes a readily available 60 hz. power source for its operation.

A still further object of this invention is to provide such an ion generator which creates without the use of a fan or other moving parts an air draft for the delivery of the generated ions to the surrounding atmosphere.

A still further object of this invention is to provide such an ion generator which requires a minimum of routine maintenance.

A still further object of this invention is to provide such an ion generator in a form which is inexpensive in terms of initial and operating costs and has a long operating life.

Yet another object of this invention is to provide such an ion generator which is adequately shielded and protected to prevent accidental injury to the user.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
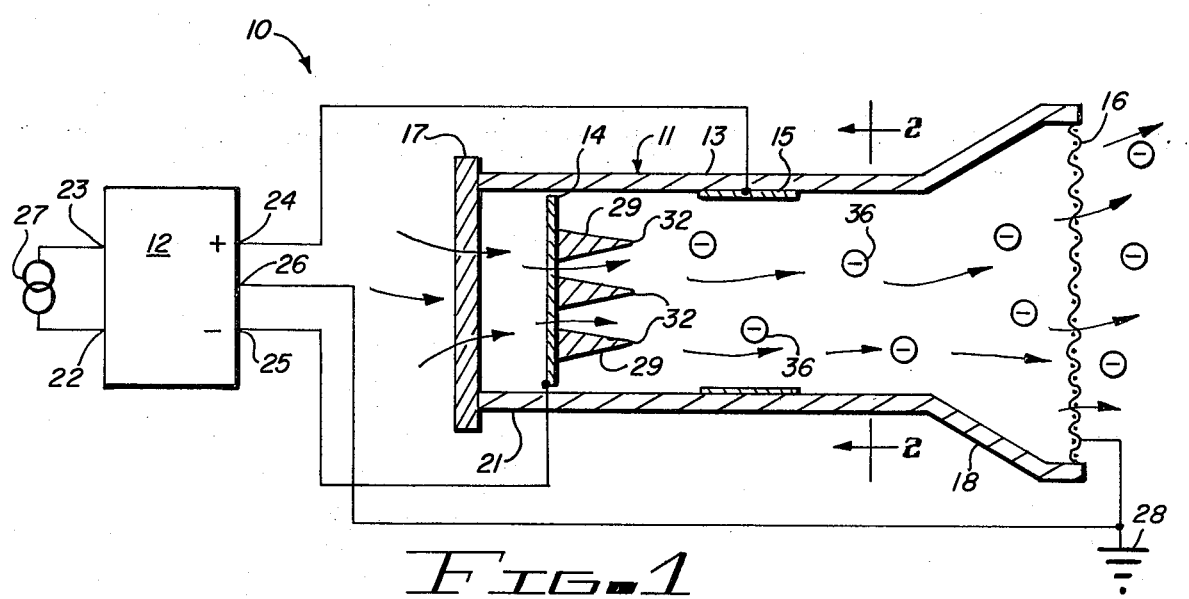
FIG. 1 is a sectional view and schematic of a first embodiment of the invention.
Figures 2, 4:
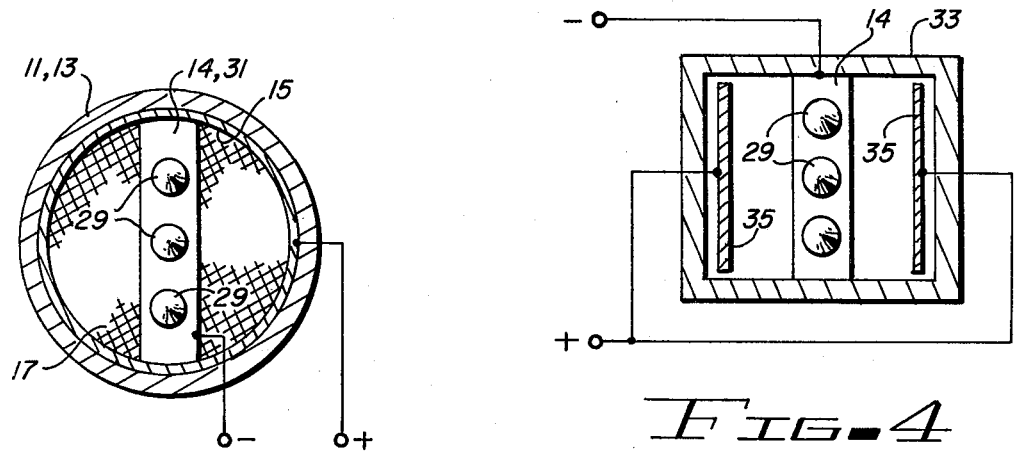
FIG. 2 is a second sectinal view of the ion generator taken along line 2—2 of FIG. 1.
FIG. 4 is a sectional view of a second embodiment of the invention.
Figures 3, 5:
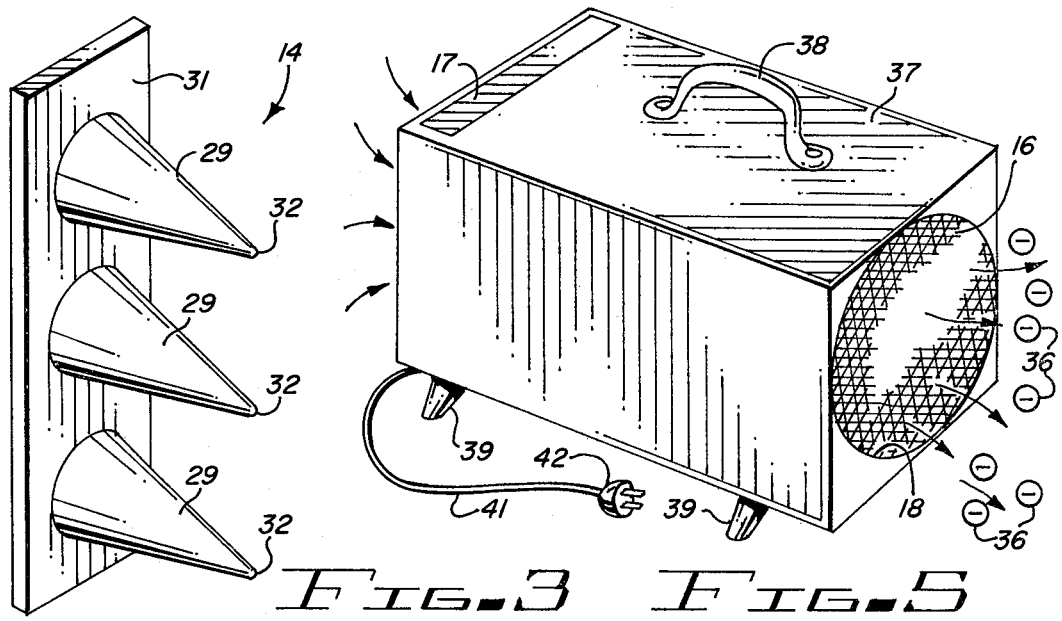
FIG. 3 is a perspective view of the negative electrode array utilized in the ion generator of FIGS. 1 and 2.
FIG. 5 is a perspective view of an ion generator incorporating the features of the invention in a structure suitable for home use.

Referring more particularly to the drawing by characters of reference, FIGS. 1-3 disclose an improved ion generator 10 comprising an ion gun 11 connected to a three-terminal d-c source 12.

The gun 11 comprises a tubular shell 13, a negative electrode 14, a positive ring or anode 15, a conductive grounding screen 16 and an air filter 17. The shell 13 in the embodiment of FIGS. 1-3 is made of an electrically insulating material and is cylindrical over its length except at its exhaust end where it terminates in a conically flared opening 18. The screen 16 covers opening 18 and the filter 17 covers the opposite end 21. The negative electrode 14 is located just inside shell 13 near end 21 and anode 15 is located near the longitudinal center of shell 13.

The d-c source 12 has two input terminals 22 and 23 and three output terminals including a positive output terminal 24, a negative output terminal 25 and a ground terminals 26. Input terminals 22 and 23 are connected to an alternating current source 27, positive output terminal 24 is connected to anode 15, negative output terminal 25 is connected to negative electrode 14, and the ground terminals 26 is connected to screen 16 which in turn, is connected to an electrical safety ground 28. The nature of the d-c source 12 is not critical to the proper functioning of the invention. Its output may be filtered and substantially ripple-free or it may produce an unfiltered, pulsating d-c voltage. It may comprise a simple step-up transformer and rectifier operating at line frequency or a high-frequency converter.

Various shapes or configurations may be utilized for the negative electrode 14. In the preferred embodiment as shown in FIGS. 1-3 the negative electrode 14 comprises an array of cone-shaped protrusions 29 projecting from a rectangular plate 31. While three protrusions 29 are shown in FIGS. 1-3, the number is not critical. The conical shape of the protrusions is also not essential to the proper functioning of the device since the general shape of the protrusion could be pyramidal or even wedge-shaped.

In all such variations, however, one important characteristic or criterion is essential i.e. the tip or apex 32 must be rounded rather than sharp. A sharp point has been found to produce objectionably high levels of ozone and other undesirable by-products along with the negative ions. When a rounded tip or apex 32 is employed the relative amount of the unwanted by-products is reduced to insignificant levels.

The cylindrical forms of anode 15 and shell 11 are also not essential. FIG. 4 illustrates that a rectangular shell 33 may be employed with the anode comprising a pair of parallel flat plates 34 and 35 positioned opposite each other adjacent the opposite walls of the rectangular shell 33.

In the operation of the ion generator 10, the d-c source 12 produces at terminal 24 and at anode 15 a high positive potential relative to ground terminal 26 and it produces at terminal 25 and at negative electrode 14 an equally high negative potential relative to ground terminal 26. When the total potential difference between anode 15 and negative electrode 14 is in the neighborhood of four thousand to five thousand volts a significant level of negative ion generation occurs at the apex 32 of each of the protrusions 29. The positive potential of anode 15 produces an electrostatic field inside shell 13 which causes the generated ions 36 to be accelerated in the direction of the anode. Kinetic energy carries the negative ions past the anode through end 18 and through screen 16 to the outside atmosphere. In the practical implementation of the invention the effect is so pronounced that an air draft can be felt at the end 18, the draft being produced by the flow of ionized air delivered by gun 11. This natural draft produced by the action of the electrostatic field on the ionized air obviates the need for a fan or other mechanical device. Air entering gun 11 at end 21 passes through air-filter 17 so that dust particles are retained and prevented from contaminating the interior of the gun. Screen 16 constitutes a safety shield protecting the user against contact with the hazardous voltages present at electrode 14 and anode 15. In addition, screen 16 collects any small amounts of ozone which might be generated by gun 11.

FIG. 5 illustrates a version of the ion generator 10 mounted in a cabinet designed for appearance and convenience of use in the home. Cabinet 37 is in the form of a rectangular box equipped with a carrying handle 38 and feet 39. The grounding screen 16 is mounted in one end and the air filter 17 fits into a slot in the other end. The circular opening 18 is visible through screen 16. An electric cord 41 and plug 42 are provided for connection to an alternating current source.

Figure 6:
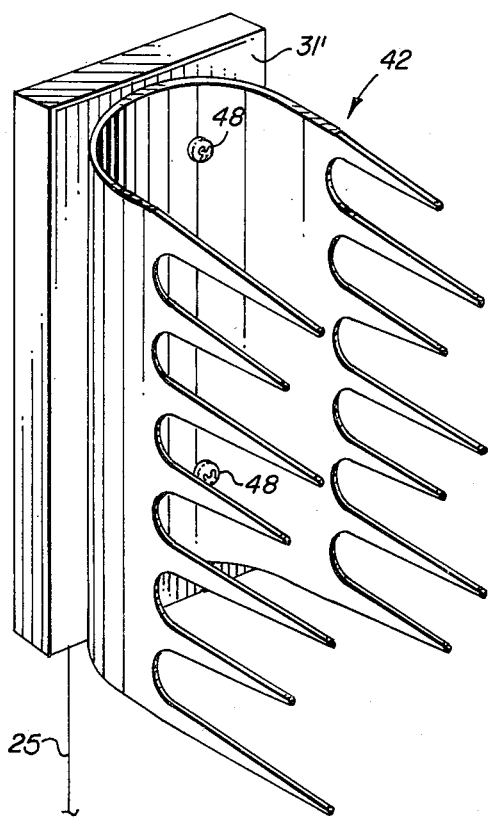
FIG. 6 is a perspective view of the modification of the negative electrode structure shown in FIGS. 1-3.
Figure 7:
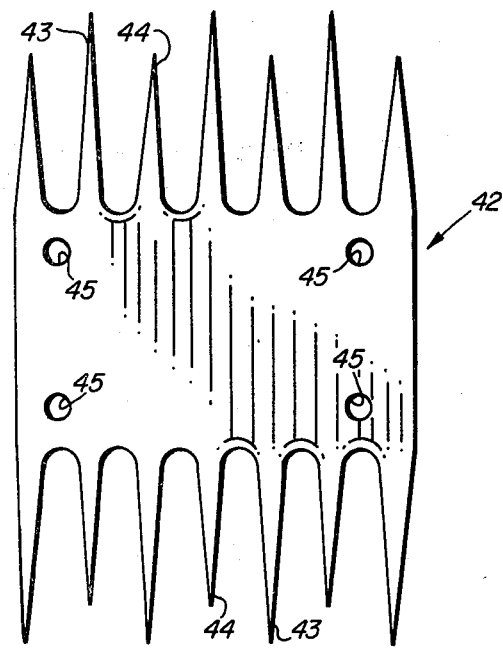
FIG. 7 is a plan view of the pointed protrusions of the negative electrode structure shown in FIG. 6.

FIGS. 6 and 7 disclose a further modification of the negative electrode structure for use in an ion gun of the type shown in FIG. 1 wherein a flat plate 42 is serrated, slotted or grooved along its sides to provide pointed protrusions 43 and 44 which may be of different lengths. This plate is then bent over into a U-shaped configuration as shown in FIG. 6 and fastened to a rectangular plate 31' by means of screws or bolts 48 extending through a plurality of spaced apertures 45 formed in plate 42.

This electrode configuration, as shown in FIG. 6, is then fastened inside of the ion gun 10 in the same manner as negative electrode 14 of FIG. 1 with the pointed protrusions 43 and 44 of the legs of the U-shaped configuration extending toward the positive energized plates 15.

Figure 8:
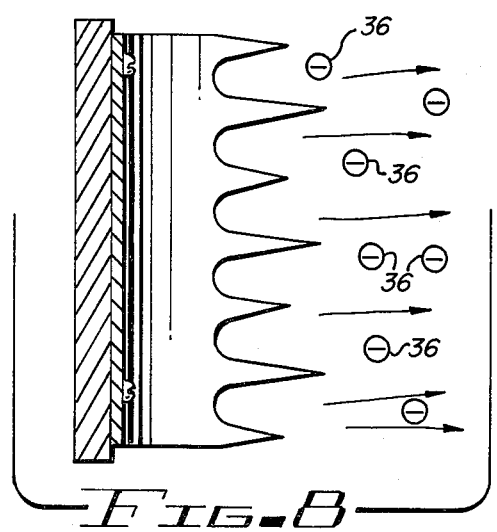
FIG. 8 is a cross-sectional view of a structure similar to that shown in FIG. 6 illustrating the negative ion flow.

FIG. 8 illustrates the negative ions 36 flowing from the negative electrode structure 42 toward the open end of the ion gun.

Figure 9:
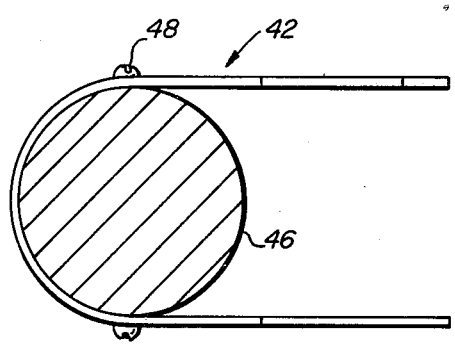
FIG. 9 is a cross-sectional view of a further modification of the negative electrode pointed protrusions shown in FIGS. 6-8 wrapped around a cylindrical conductor.

FIG. 9 illustrates that the cylindrical electrode 46 connected to the negative output terminal 45 may be fastened inside of the curved or U-shaped form of plate 42 in place of the outside arrangement of plates 12 and 31' as shown in FIGS. 1 and 6.

Figure 10:
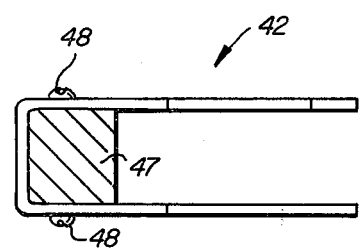
FIG. 10 is a cross-sectional view of a still further modification of the negative electrode pointed protrusions shown in FIGS. 6-9 wrapped around a conductor having a rectangularly shaped configuration.

FIG. 10 illustrates a further modification of the negative electrode structure shown in FIG. 9 wherein the plate 42 is bent into a U-shaped configuration around an electrode 47 having a square or rectangular cross-sectional configuration.

A practical and effective ion generator is thus provided in accordance with the stated objects of the invention, and although but a single embodiment of the invention has been illustrated and described, it will be apparent to those skilled in the art that various changes and modifications may be made therein without departing from the spirit of the invention or from the scope of the appended claims.

What is claimed is:

1. An apparatus for generating negative ions for propulsion into the atmosphere of a controlled environment comprising:

an ion gun, said gun comprising an open ended hollow elongated tubular shell flared outwardly at its exhaust end, a negative electrode positioned to extend across at least a part of said shell at a given distance from the opposite end of said shell, said negative electrode comprising a plurality of spaced protrusion extending from a plate mounted transversely of the hollow interior of said shell longitudinally of and toward said flared end of said shell, said protrusions comprising conically shaped configurations having rounded apexes to reduce ozone generation mounted with their bases on said plate and their apex ends extending toward the flared end of said shell, a positive ring shaped anode arranged around at least a part of the periphery of said shell at a second greater distance from said opposite end of said shell, a metallic screen mounted across said flared end of said shell, a d-c source of electrical potential connected to said shell for charging said negative electrode and said positive anode sufficiently to generate negative ions at said negative electrode and to produce sufficient kinetic energy to expell the negative ions past said positive anode and out of said flared end of said shell, and an air filter mounted transversely of the hollow interior of said shell between said opposite end of said shell and said negative electrode.

2. The apparatus set forth in claim 1 wherein:
said electrode comprises a rectangular configuration.

3. The apparatus set forth in claim 1 wherein:
said electrode comprises a cylindrical configuration.

4. The apparatus set forth in claim 1 wherein:
said negative electrode comprises a U-shaped member the legs of which are serrated to provide a plurality of protrusions extending toward said flared end of said shell.

5. The apparatus set forth in claim 1 wherein:
at least some of said protrusions are of different lengths.

* * * * *